United States Patent
Kawamura et al.

(10) Patent No.: US 6,546,920 B1
(45) Date of Patent: Apr. 15, 2003

(54) CONTROLLER OF EXHAUST GAS RECIRCULATION VALVE

(75) Inventors: Satoshi Kawamura, Tokyo (JP); Sotsuo Miyoshi, Tokyo (JP); Toshihiko Miyake, Tokyo (JP); Youichi Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,316

(22) PCT Filed: Feb. 25, 2000

(86) PCT No.: PCT/JP00/01130
§ 371 (c)(1),
(2), (4) Date: Oct. 23, 2001

(87) PCT Pub. No.: WO01/63114
PCT Pub. Date: Aug. 30, 2001

(51) Int. Cl.⁷ ............................................. F02M 25/07
(52) U.S. Cl. .............................. 123/568.23; 251/129.11
(58) Field of Search .................. 123/568.23, 568.24; 251/129.04, 129.05, 129.11

(56) References Cited

U.S. PATENT DOCUMENTS

| | | | | |
|---|---|---|---|---|
| 5,501,201 A | * | 3/1996 | Miyoshi et al. | 123/571 |
| 5,520,159 A | * | 5/1996 | Pao et al. | 123/571 |
| 6,012,437 A | * | 1/2000 | Radhamohan et al. | 123/568.23 |
| 6,415,776 B1 | * | 7/2002 | Gates et al. | 123/568.24 |
| 2002/0112709 A1 | * | 8/2002 | Itoi et al. | 123/568.24 |

FOREIGN PATENT DOCUMENTS

JP 10-122059 5/1998 .......... F02M/25/07

* cited by examiner

Primary Examiner—Thomas N. Moulis
(74) Attorney, Agent, or Firm—Sughrue Mion, PLLC

(57) ABSTRACT

Hysteresis correction is carried out based on an amount of deviation between input data indicative of the target opening/closing position of a control valve, and the current opening/closing position of the control valve, or based on the output value of a PI controlled variable operation unit, to which a value of the deviation is entered.

4 Claims, 13 Drawing Sheets

(a)

(b)

(a)

(b)

(a)

(b)

(a)

VALVE OPERATION QUANTITY
= SECOND OPERATION QUANTITY
= MOTOR DRIVING VOLTAGE VALUE (b)

VALVE OPERATION QUANTITY
= SECOND OPERATION QUANTITY
= MOTOR DRIVING VOLTAGE VALUE (c)

FIRST OPERATION QUANTITY
= OUTPUT QUANTITY OF ADDER 119 (OR 129)

CONTROLLER OF EXHAUST GAS RECIRCULATION VALVE

This application is the national phase under 35 U.S.C. § 371 of PCT International Application No. PCT/JP00/01130 which has an International filing date of Feb. 25, 2000, which designated the United States of America and was not published in English.

TECHNICAL FIELD

This invention relates to an exhaust gas recirculation (referred to as EGR, hereinafter) valve controller provided in an exhaust gas recirculation system.

BACKGROUND ART

FIG. 1 is a constitutional view of an engine exhaust system, in which the control valve 11 of an EGR valve is arranged in an exhaust recirculation passage c for communicating the exhaust passage a and the intake passage b of an engine E with each other. This EGR valve controller is adapted to control the opening/closing of the control valve 11 by, for example, a stepping motor M of a hybrid PM 4-phase type or the like. The EGR valve controller controls the opening angle of the control valve 11 by subjecting the stepping motor M to open loop control in steps of a stepping angle.

The controller using such a stepping motor M is capable of controlling the opening angle of the control valve 11 only in steps of the stepping angle of the stepping motor M. Thus, there is a limit to the resolving power of the control valve 11 to control the opening angle. In addition, in the open control of the stepping motor M, a power swing phenomenon sometimes occurs, placing a limit on responsiveness. Once power swing occurs, a difference occurs in controlled variables, and this difference is maintained, consequently reducing reliability.

EGR valve controllers designed to deal with the foregoing problem have been available in the related art. For example, Japanese Patent Laid-Open Application Hei 10 (1998)-122059 discloses a controller for an EGR valve, which opens/closes on a torque balance between a predetermined return torque applied in the opening/closing direction of the control valve 11 by pressing means, and a variable motor torque applied in the closing/opening direction of the control valve 11 by the energization of a direct current motor (referred to as a DC motor, hereinafter) in one direction. This controller comprises: an open loop control system for open-loop controlling the DC motor in such a way as to generate a motor torque corresponding to the target opening/closing position of the control valve 11; and a feedback control system for feedback-controlling the DC motor based on deviation between input data indicative of the target opening/closing position of the control system 11, and detection data indicative of the actual opening/closing position of the control valve 11.

First, a driving system using the above DC motor will be described. To feedback-control the opening angle of the control valve by a DC servo motor system, the opening angle of the control valve 11 is continuously detected and fed back by using a position sensor of a sliding resistance type or the like. Thus, by continuously controlling the torque generated by the DC motor, the resolving power of the control valve 11 to control an opening angle can be infinitely reduced theoretically. In the DC motor, unlike the case of the stepping motor M, there are no control errors caused by a power swing phenomenon. Accordingly, responsiveness can be improved compared with a case in which the stepping motor M is used, thus enhancing reliability.

The EGR valve driving system using such a DC motor employs a so-called torque balance system, which is adapted to control valve opening/closing on a torque balance between a predetermined return torque applied in a closing direction (or opening direction) by a spring as pressing means, and a variable motor torque applied in an opening direction (or closing direction) by the energization of the DC motor in one direction. In the case of such a driving system, since the return torque is always applied to the EGR valve, the inclinations of lines A and B undergoing a hysteresis caused by friction exhibits a difference, as shown in FIG. 2.

Referring to FIG. 2, the line A indicates an operation characteristic when the control valve 11 is opened by increasing the motor torque; and the line B an operation characteristic when the control valve 11 is closed by reducing the motor torque. The inclinations of the lines A and B are changed by a spring constant of the spring applying the return torque, and the lines A and B are shifted left and right in FIG. 2 according to the magnitude of a set torque.

It is now assumed that the mere PI control is employed to control the control valve 11 of the foregoing operation characteristics, wherein the DC motor is subject to proportion and integration (PI) control based on a deviation between input data indicative of the target opening/closing position of the control valve 11, and detection data indicative of the actual opening/closing position of the same. In this case, because of the operation characteristics shown in FIG. 2, it is difficult to maintain the control valve 11 in the target opening/closing position.

Specifically, proportion (P) and integration (I) gains must be increased in order to execute control along the line A, considering the operation characteristics shown in FIG. 2. However, under such setting, when the motor torque is increased based on the PI control, the deviation from the target opening position becomes "0" immediately after the control valve 11 is opened to the target opening position, setting a P component equal to "0" and clearing an I component, and the closing of the control valve 11 is immediately started by the return torque. In an initial stage when the valve closing has just started (small deviation), the motor torque cannot overcome the return torque because the P and I components are both small, thus enlarging deviation. Thereafter, even if the deviation grows to a point that the motor torque and the return torque are balanced, the closing operation of the control valve 11 cannot be stopped suddenly due to the inertia of the DC motor, and consequently the opening operation of the control valve 11 cannot be immediately started. If a gain is increased in such a way as to generate relatively large motor torque even when the deviation is small, as shown in FIG. 3, the process is brought into a vicious cycle of increased overshoots and undershoots.

A description will be given of one related-art construction of the controller of the control valve based on a so-called torque balance driving system using the DC motor, by referring to FIGS. 4 to 7. In FIG. 4, a reference numeral 1 denotes a valve body having an exhaust recirculation passage c formed in the recirculation system of exhaust gas. The control valve 11 is raised as shown to be brought into contact with a seat 12, thereby closing the exhaust passage c. The control valve 11 is lowered to be separated from the seat 12, thereby opening the exhaust passage c.

A reference numeral 2 denotes a motor case for housing a DC motor 20. This DC motor 20 includes a rotor 21 having a coil 22 wound thereon, and a yoke 23 having a magnet 24.

The upper end part of the rotor 21 is rotatably supported in the motor case 2 by a slide ball 25 and a rotor shaft 26. The lower end part of the rotor 21 is rotatably supported in the valve body 1 by a bearing 27. A commutator 28 is attached to the upper end of the rotor 21, and the motor brush 30 of the motor case 2 side is pressed against the commutator 28 by a brush spring 29.

A reference numeral 40 denotes a position sensor for detecting the rotational position of the rotor 21, a resistance value of the position sensor 40 varying according to the rotational position of the rotor 21. The position sensor 40 and the motor brush 30 are connected to the controller (described later) by a connector terminal 3.

A motor shaft 31 is engaged inside the rotor 21, and the motor shaft 31 is prevented from being rotated by the guide bush 13 of the body 1. Accordingly, the motor shaft 31 is raised and lowered in proportion to the magnitude of rotation of the rotor 21. A shaft 14 is abutted against the lower end of the motor shaft 31. The middle part of the shaft 14 is guided so as to be freely raised and lowered in the valve body 1 by a guide seal 15 and a guide plate 16. The control valve 11 is attached to the lower end of the shaft 14.

A reference numeral 17 denotes a guide seal cover. Between a spring seat 18 attached to the upper end of the motor shaft 14, and the guide plate 16, a spring 19 is provided to press the shaft 14 upward, i.e., in the closing direction of the control valve 11.

The control valve 11 constructed in the foregoing manner is driven by a torque balance system like the one described above. Specifically, the EGR valve is designed such that the control valve 11 is controlled to be opened/closed based on a torque balance between a predetermined return torque applied in the closing direction of the control valve 11 by the spring 19 as pressing means, and a variable motor torque applied in the opening direction of the control valve 11 by the energization of the DC motor 20 in one direction.

FIG. 5 is a constitutional view schematically showing the entire controller, in which a motor driving voltage is determined by a control unit 50 implemented by a microcomputer. A reference numeral 52 denotes a battery; and 53 a motor driving voltage conversion unit for converting the output of a PI controlled variable operation unit 63 (described later), and feeding the converted result to the DC motor 20. The operation unit 63 includes a Zener diode 53a, a diode 53b for controlling a current to flow in one direction in the DC motor 20, a field-effect transistor (FET) 53c, and an interface provided between the control unit 50 and the FET 53c. A reference numeral 56 denotes a regulator for securing a driving voltage (5V) for the control unit 50.

The control unit 50 receives a detected signal from a running state quantity sensor 57 such as a crank angle sensor or the like, and a detected signal from the position sensor 40 supplied via interfaces 58 and 59, respectively. The position sensor 40 of the described example has a movable contact part 42 moved on a resistor 41, to which a constant voltage (5V) is applied from a voltage supply unit 60. This movable contact part 42 is moved in accordance with the rotation of the rotor 21 and, accordingly, a voltage corresponding to the rotational position of the rotor 21 is outputted as a detected signal from the movable contact part 42.

In addition, the motor driving voltage conversion unit 53 is adapted to control an average driving voltage applied to the DC motor 20, by turning ON/OFF a voltage applied to the DC motor 20 at a fixed cycle, and switchably operating the FET 53c based on a PWM signal corresponding to a ratio of ON time to OFF time (driving duty) per cycle.

FIG. 6 is a block diagram schematically showing a control system composed of the control unit 50. In FIG. 6, a reference numeral 61 denotes a target position operation unit for obtaining an optimal opening/closing position of the control valve 11 based on the detected signal of the running state quantity sensor 57. The target position operation unit 61 outputs a voltage (referred to as a "target value (1)", hereinafter) corresponding to the target position 62 denotes an A/D conversion unit for subjecting the detected signal of the position sensor 40 to A/D conversion. The A/D conversion unit 62 outputs a voltage (referred to as a "current value (2)", hereinafter) corresponding to the current opening/closing position of the control valve 11. 71 denotes an adder/subtractor adding or subtracting one from the other the target and current values (1) and (2). Based on a deviation between the target and current values (1) and (2), the PI controlled variable operation unit 63 calculates a PI controlled variable (voltage) composed of a proportion component (P component) and an integration component (I component), and then outputs the variable.

FIG. 7 is a detailed view of the PI controlled variable operation unit 63. Reference numerals 72 and 73 denote amplifiers for amplifying the output of the adder/subtractor 71; 74 an integrator for integrating the output of the amplifier 73; 75 a subtractor for subtracting one from the other the outputs of the amplifier 72 and the integrator 74; 76 an amplifier having a saturation function for saturating the output of the subtractor 75; and 77 a display for displaying the target and current values (1) and (2), and the output value of the amplifier 76.

FIG. 8(a) is a graph showing the variation of the detection value (ordinate) of the position sensor 40 with respect to time (abscissa), in which indicates an ideal characteristic, and L an actual operation characteristic. FIG. 8(b) is a graph showing the variation of the applied voltage of the DC motor with respect to time (abscissa).

Next, an operation will be described.

As shown in FIG. 7, the feedback control system performs PI control to compensate for a deviation (excess/shortage of open loop control) between the current and target values (2) and (1). As a result, the control valve can be stabilized at the target position irrespective of the opening/closing direction of the control valve 11.

In the related-art PI controlled variable operation unit 63 shown in FIG. 7, when a feedback quantity is increased, a voltage applied to the DC motor 20 varies with time as shown in FIG. 8(b), concurrent with the variation of the detection quantity (FIG. 8(a)) of the position sensor 40 for detecting the control valve position. Due to hysteresis as shown in FIG. 15(a), which is a graph showing the variation of a characteristic of a valve opening angle with respect to a motor driving voltage value, the control is delayed by a hysteresis amount W. As a result, the control valve position exhibits "hunting" around a target position. It remains necessary, however, that a feedback quantity must be sufficiently increased to operate the valve mechanism at a response speed for which the valve mechanism is made for.

In the conventional exhaust gas recirculation valve controller constructed in the foregoing manner, because of hysteresis, responsiveness is low, and it is impossible to accurately control the control valve.

The present invention is designed to solve the foregoing problems, and it is an object of the invention to provide an exhaust gas recirculation valve controller capable of canceling hysteresis, and improving controllability based on the input quantity of the PI controlled variable operation unit or an operation quantity outputted from the PI controlled variable operation unit.

DISCLOSURE OF THE INVENTION

In accordance with the present invention, there is provided a controller for an exhaust gas recirculation valve adapted to open/close on torque balance between a return torque applied by pressing means in one direction selected from opening and closing directions of a control valve, and a motor torque applied by a DC motor in the opening or closing direction of the control valve, comprising: a PI controlled variable operation unit for receiving a deviation between input data indicative of a target opening/closing position of the control valve, and detection data indicative of a current opening/closing position of the control valve; a hysteresis correction unit for obtaining a hysteresis correction quantity from an output quantity of the PI controlled variable operation unit; and a motor driving voltage conversion unit for receiving a sum of the output quantity of the PI controlled variable operation unit and the hysteresis correction quantity, and converting the result into a voltage to be supplied to the DC motor.

Thus, by obtaining a hysteresis quantity from the output quantity of the PI controlled variable operation unit, and canceling the operation hysteresis of the control valve 11 based on the hysteresis correction quantity, it is possible to control the control valve with high accuracy and responsiveness.

The hysteresis correction unit may include: a changing direction determination unit composed of a differentiator for differentiating the output quantity of the PI controlled variable operation unit, and a code discriminator for determining whether an output of the differentiator is equal to 0 or lower; and a hysteresis correction quantity operation unit composed of an amplifier for amplifying an output of the code discriminator.

Thus, it is possible to obtain a proper hysteresis correction quantity with a simple constitution.

In accordance with the invention, there is provided a controller for an exhaust gas recirculation valve adapted to open/close on torque balance between a return torque applied by pressing means in one direction selected from opening and closing directions of a control valve, and a motor torque applied by a DC motor in the opening or closing direction of the control valve, comprising: a PI controlled variable operation unit for receiving a deviation between input data indicative of a target opening/closing position of the control valve, and detection data indicative of a current opening/closing position of the control valve; a hysteresis correction unit for obtaining a hysteresis correction quantity from an input quantity of the PI controlled variable operation unit; and a motor driving voltage conversion unit for receiving a sum an output quantity of the PI controlled variable operation unit and the hysteresis correction quantity, and converting the result into a voltage to be supplied to the DC motor.

Thus, by obtaining the hysteresis correction quantity of the control valve from the input quantity of the PI controlled variable operation unit, and canceling the operation hysteresis of the control valve based on the hysteresis correction quantity, it is possible to control the control valve with high accuracy and responsiveness.

The hysteresis correction unit may include: a positive/ negative deviation determination unit for determining whether the input quantity of the PI controlled variable operation unit indicating a deviation between target and current values is equal to 0 or lower; and an amplifier for amplifying an output of the deviation positive/negative determination unit.

Thus, it is possible to obtain a proper hysteresis correction quantity with a simple constitution.

BEST MODE FOR CARRYING OUT THE INVENTION

Next, the best mode for carrying out the present invention will be described with reference to the accompanying drawings.

First Embodiment

Figure 1:
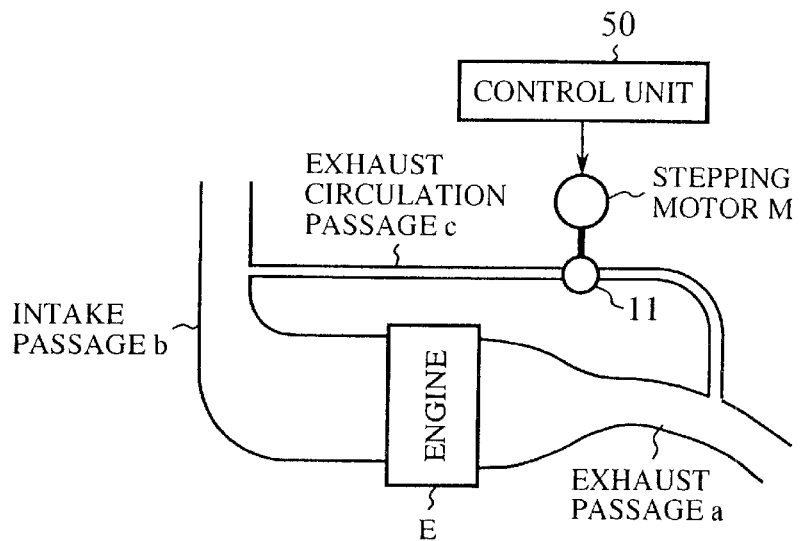
FIG. 1 is a view schematically showing an engine exhaust system.
Figure 2:
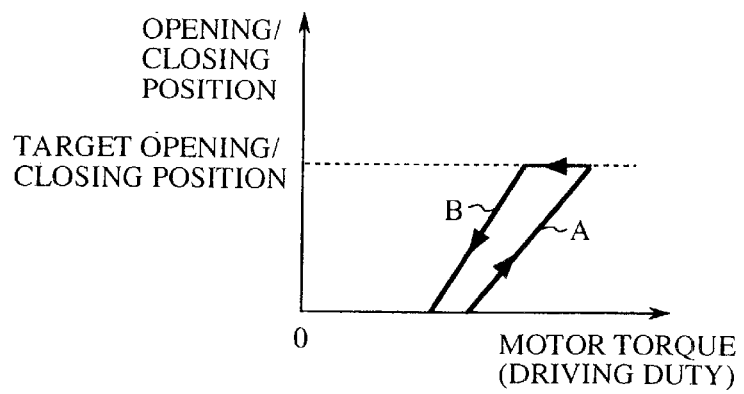
FIG. 2 is a graph showing a characteristic of a control valve opening/closing position with respect to a motor in an EGR valve of a torque balance driving system.
Figure 3:
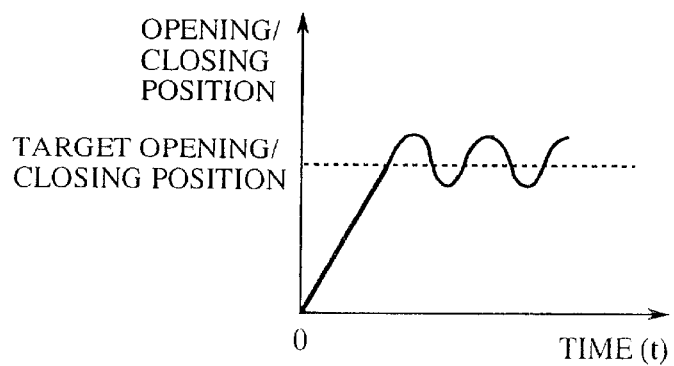
FIG. 3 is a graph showing a characteristic of a control valve opening/closing position with respect to time in the EGR valve.
Figure 4:
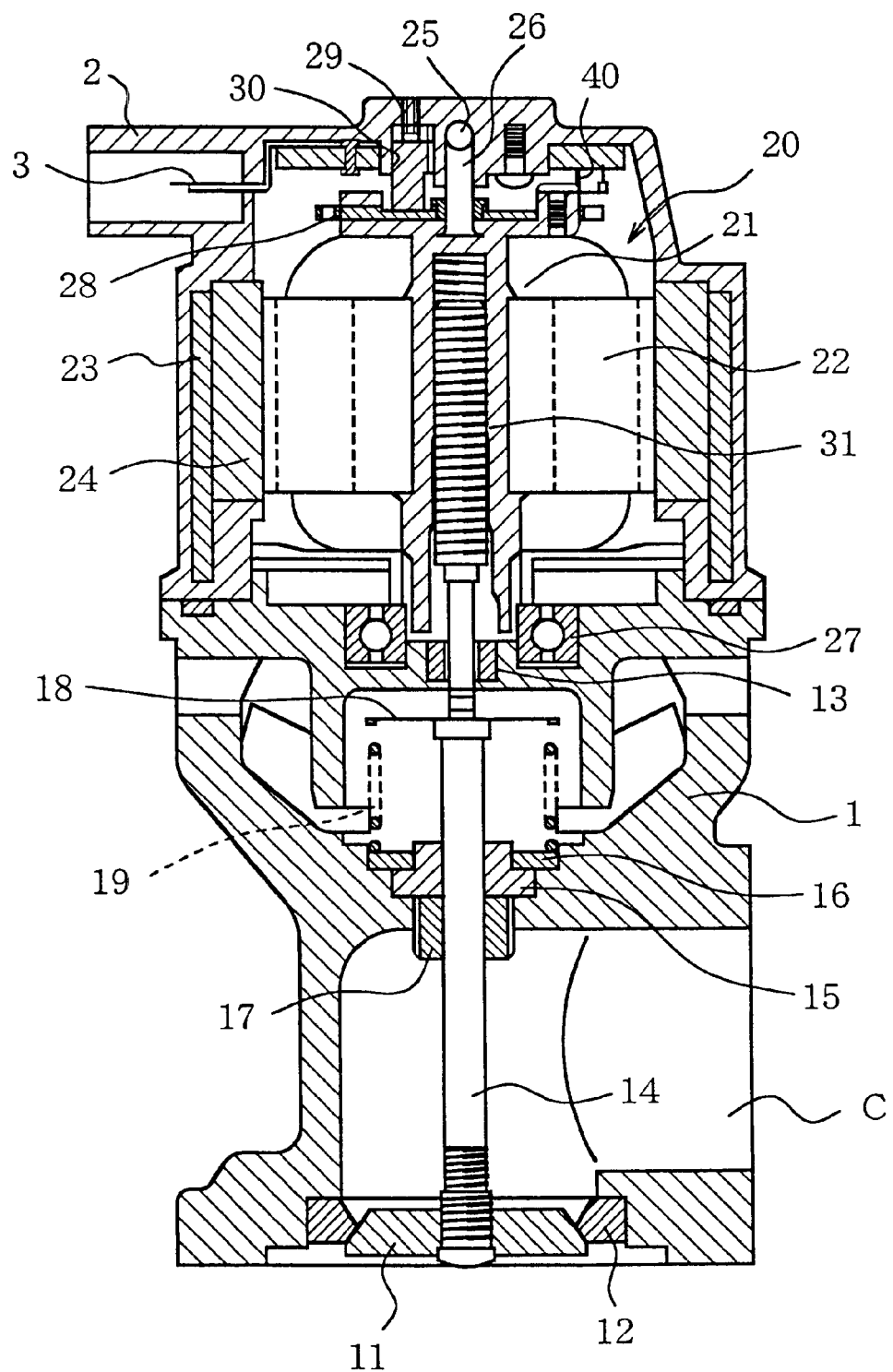
FIG. 4 is a vertical sectional view of the EGR valve.
Figure 5:
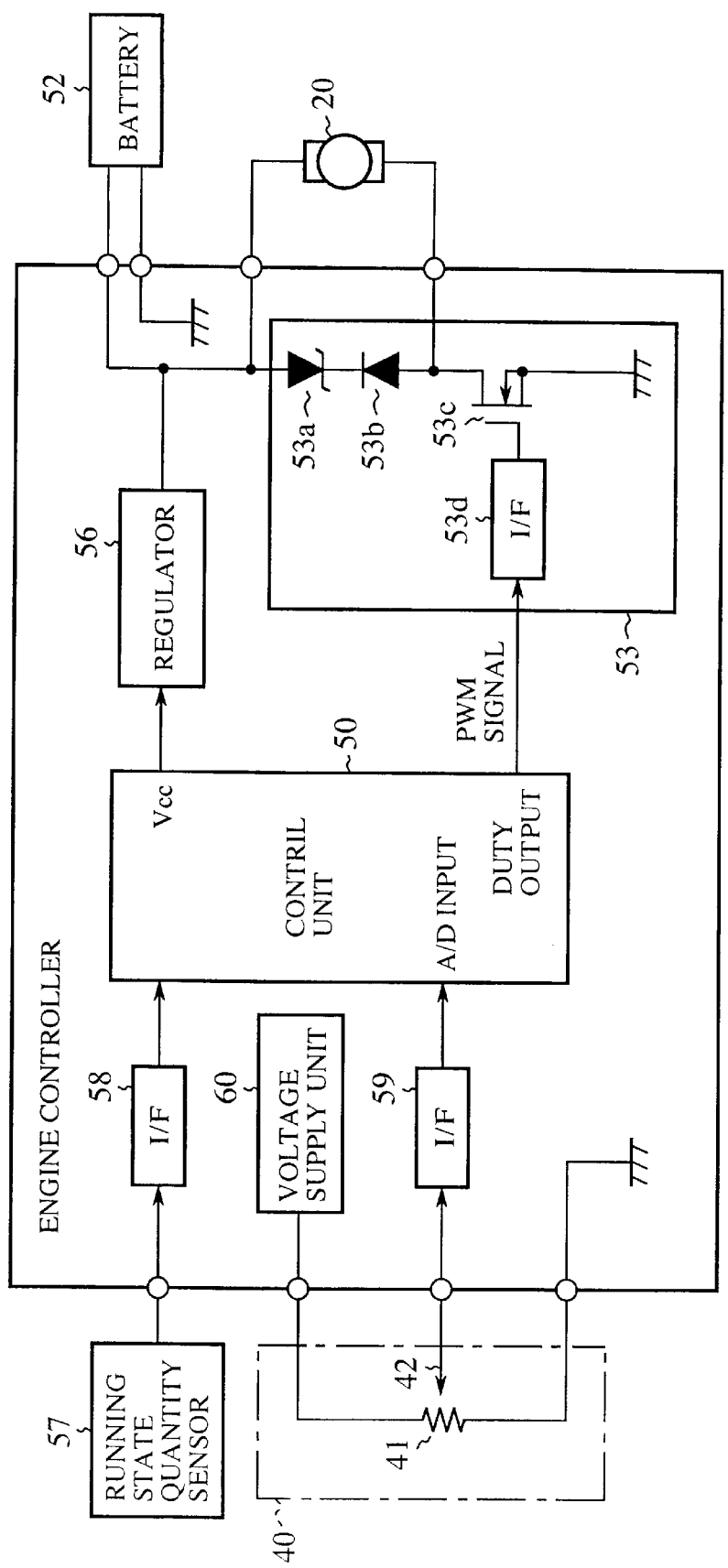
FIG. 5 is a constitutional view of a controller of a so-called torque balance driving system using a DC motor.
Figure 6:
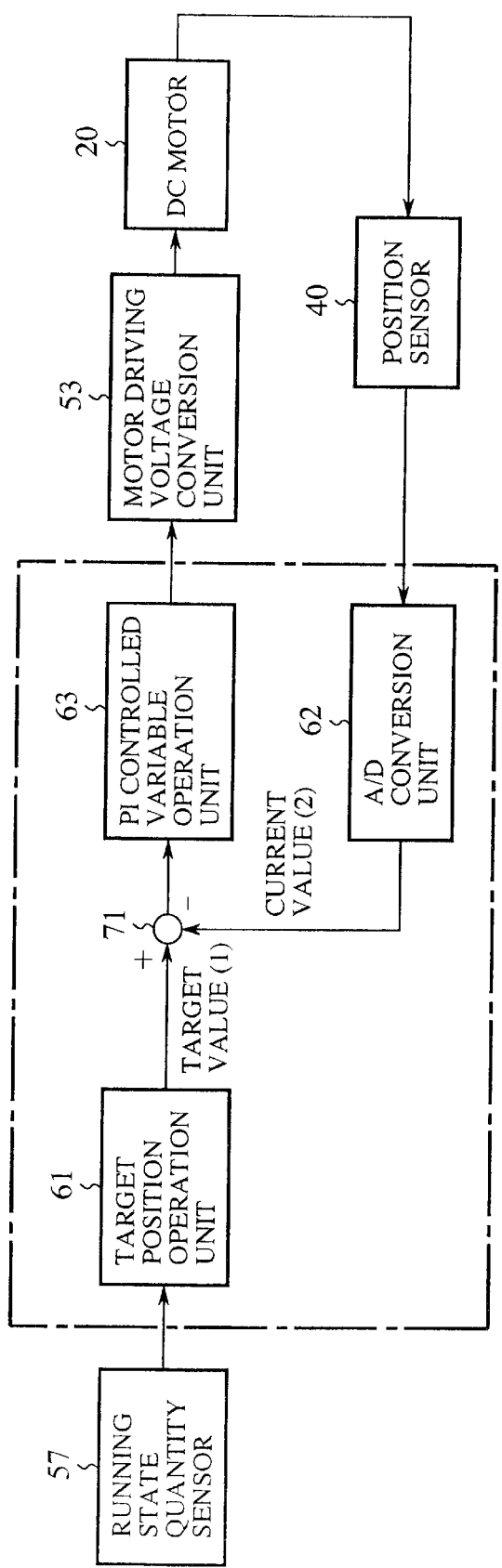
FIG. 6 is a constitutional view of a control unit in the controller.
Figure 7:
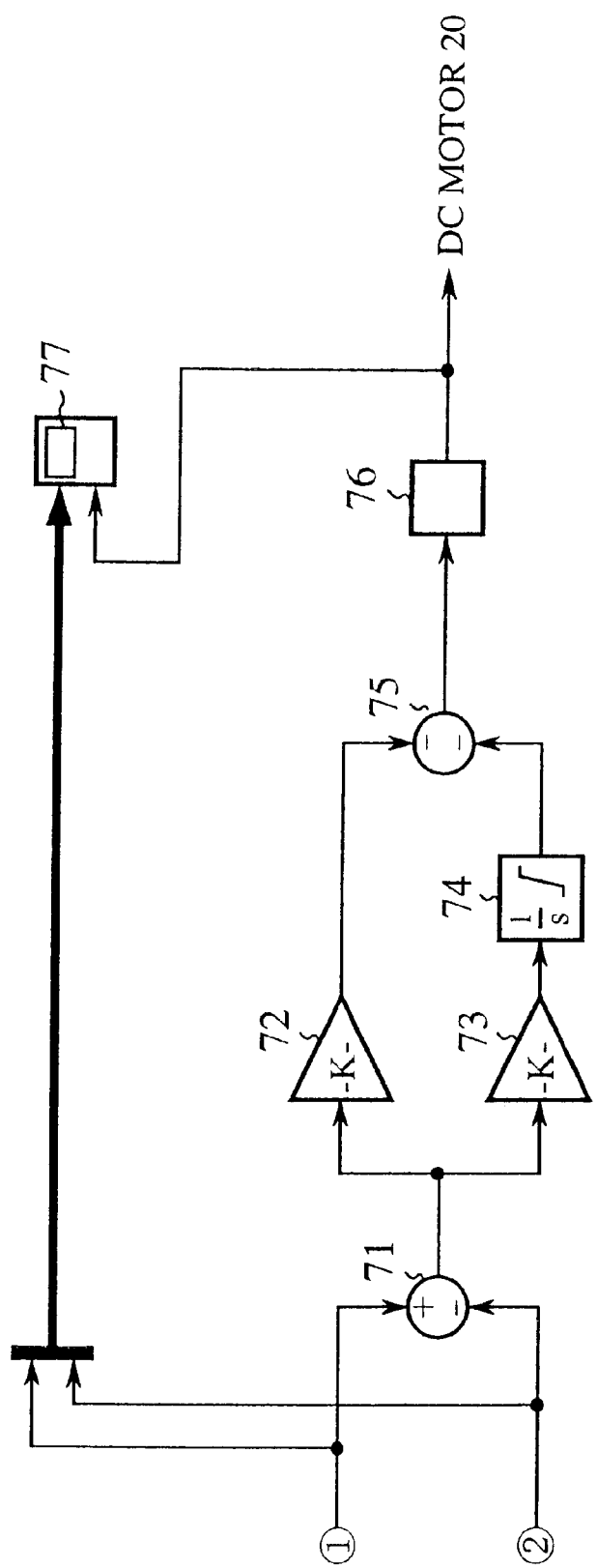
FIG. 7 is a circuit diagram showing a constitution of a PI controlled variable operation unit in the control unit.
Figure 8:
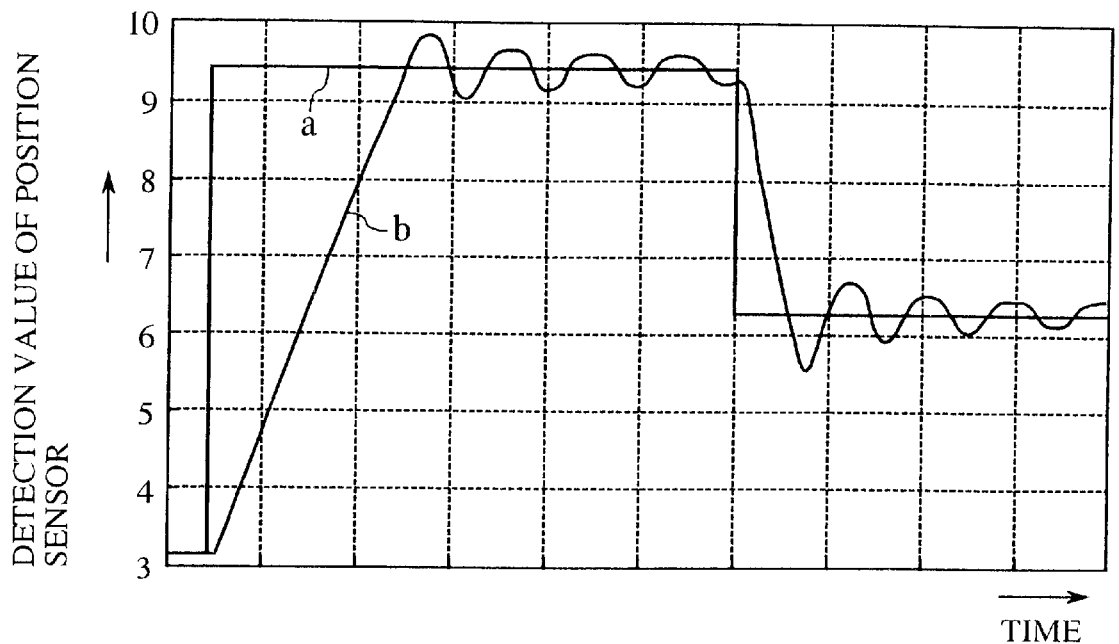
FIGS. 8(a) and 8(b) are operation characteristic views of the EGR valve.
Figure 8:
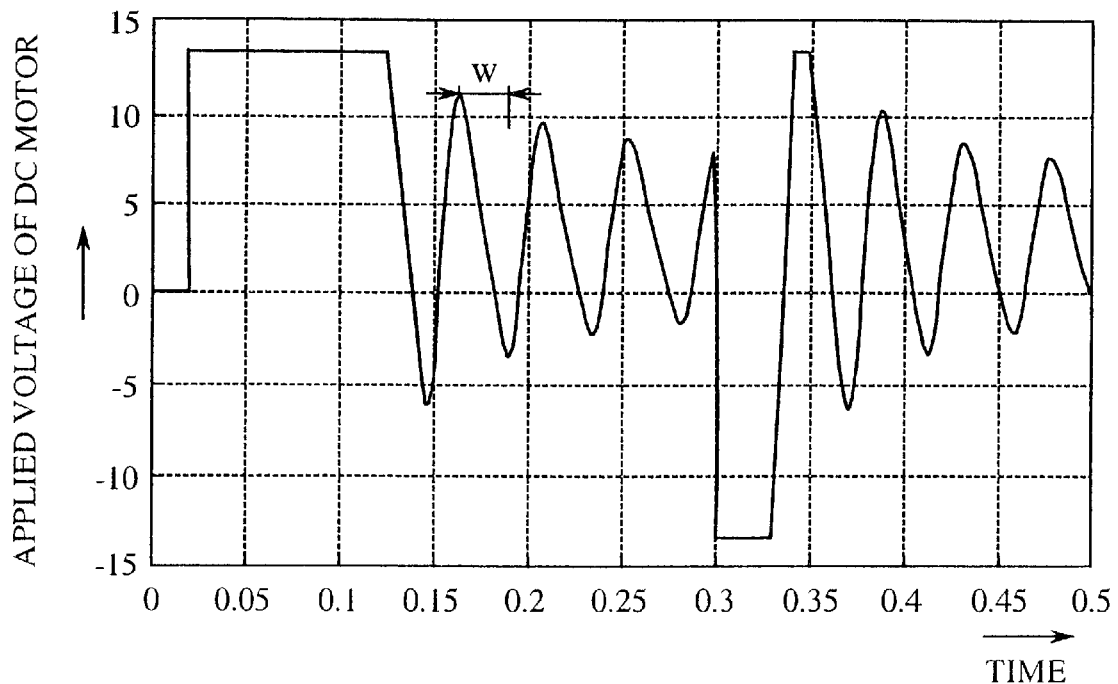
Figure 9:
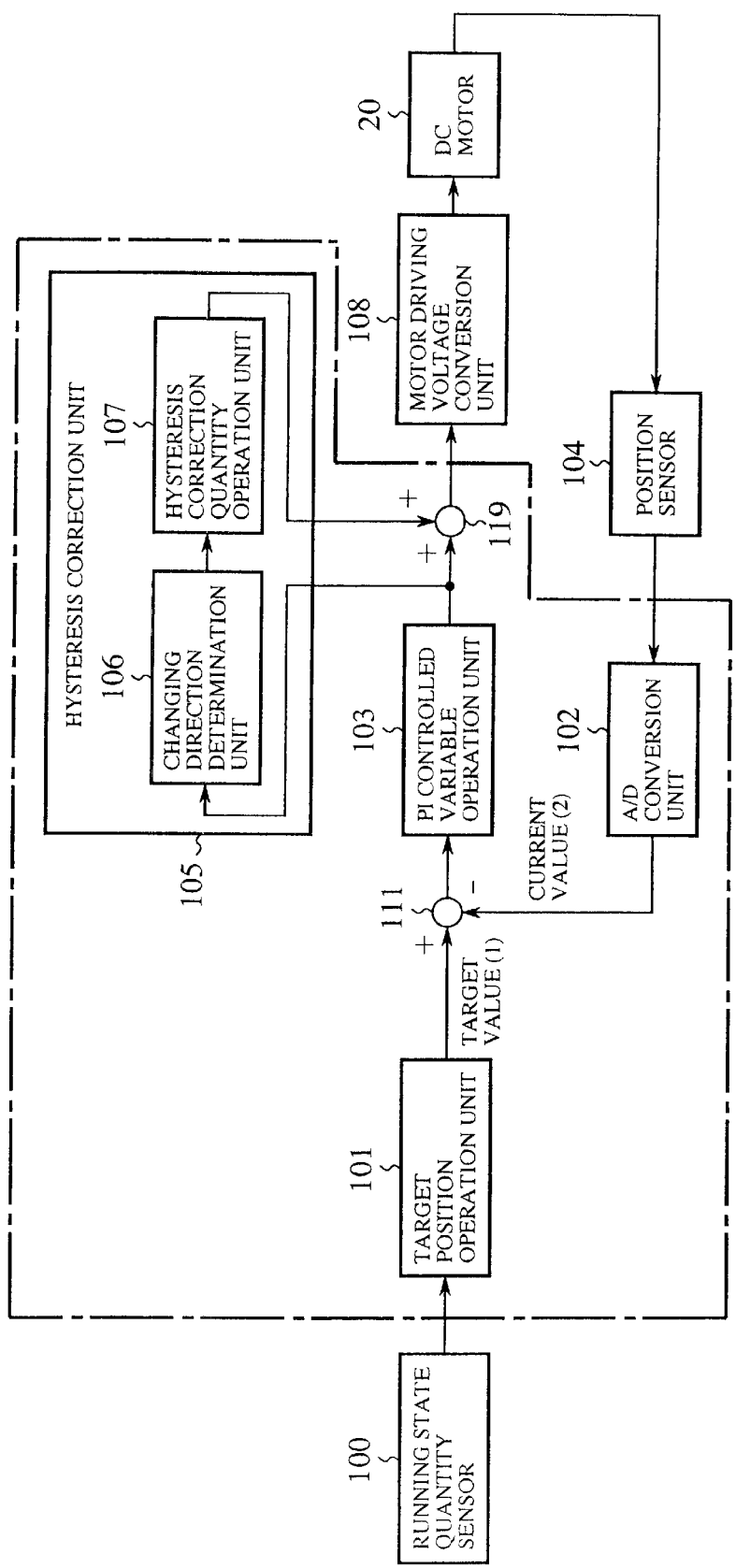
FIG. 9 is a constitutional view showing a control unit in an EGR valve controller according to a first embodiment of the present invention.

FIG. 9 is a constitutional view showing a control unit in an EGR valve controller according to a first embodiment of the invention. In FIG. 9, a reference numeral 101 denotes a target position operation unit for obtaining an optimal opening/closing position of the control valve 11 based on the detected signal of a running state quantity sensor 100. The target position operation unit 101 outputs a voltage corresponding to the target value (referred to as a "target value, (1)", hereinafter,); and 102 an A/D conversion unit for subjecting the detected signal of the position sensor 104 to A/D conversion and outputting a voltage corresponding to the current opening/closing position of the control valve 11 (referred to as a "current value (2)", hereinafter). Based on deviation between the target and current values (1) and (2), obtained by subtraction carried out by a subtractor 111, a PI controlled variable operation unit 103 calculates a PI controlled variable (voltage) composed of a proportion component (P component) and an integration component (I component), and outputs the controlled variable. A reference numeral 105 denotes a hysteresis correction unit. This hysteresis correction unit 105 includes a changing direction determination unit 106 for detecting a change, i e., an increase/decrease, in the output of the PI controlled variable operation unit 103; and a hysteresis correction quantity operation unit 107 for obtaining a hysteresis correction quantity of the control valve 11 from the output quantity of the changing direction determination unit 106. A reference numeral 119 denotes an adder for adding together the output quantity of the PI controlled variable operation unit 103 and the hysteresis correction quantity; and 108 a motor driving voltage conversion unit for receiving the addition result of the adder 119, and converting the result into a voltage to be supplied to the DC motor 20.

Figure 10:
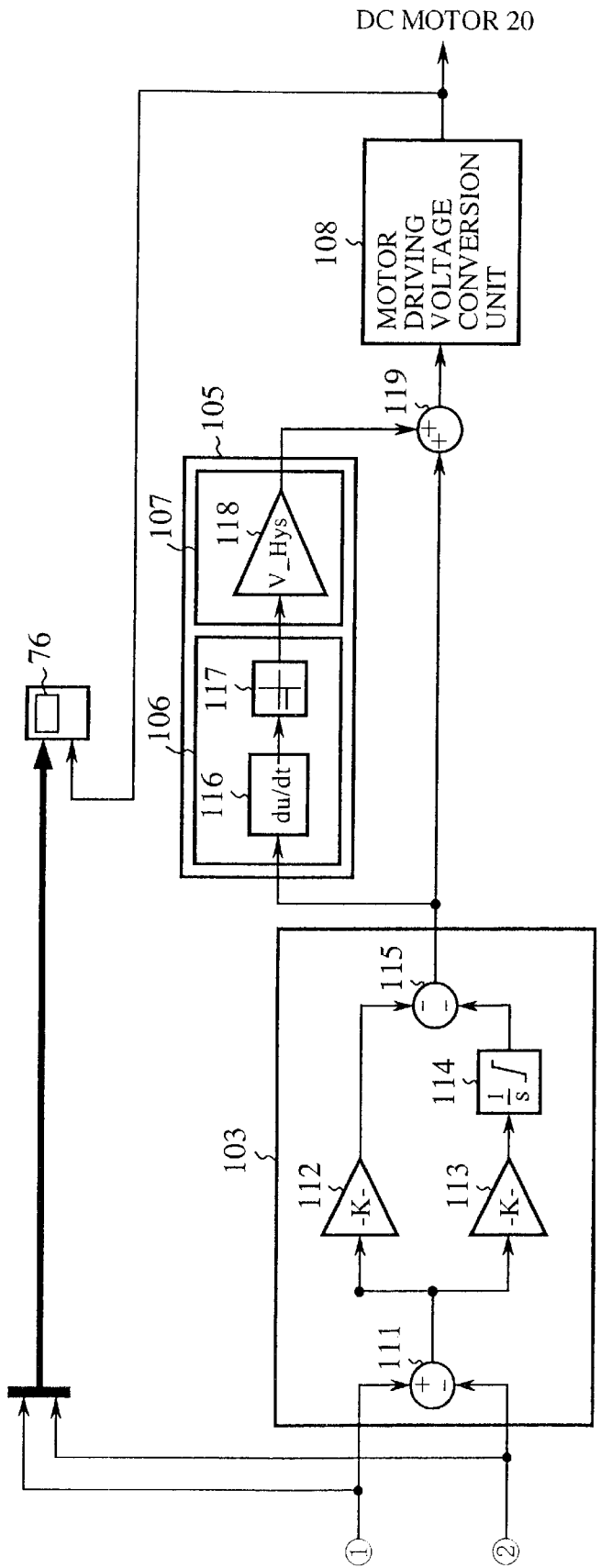
FIG. 10 is a circuit diagram of a PI controlled variable operation unit and a hysteresis correction unit in the control unit of FIG. 9.

FIG. 10 shows in detail the PI controlled variable operation unit 103, and the hysteresis correction unit 105. The PI controlled variable operation unit 103 includes: amplifiers 112 and 113 for amplifying the output of the adder/subtractor 111; an integrator 114 for integrating the output of the amplifier 113; and a subtractor 115 for subtracting one from the other the outputs of the amplifier 112 and the integrator 114. The changing direction determination unit 106 constituting the hysteresis correction unit 105 includes: a differentiator 116 for differentiating the output of the subtractor 115; and a code discriminator 117 for determining whether the output of the differentiator 116 is $\geq 0$ or $\leq 0$ (−1 if $\leq 0$), outputting −1 when the output is $\geq 0$ and outputting −1 when the output is $\leq 0$. In addition, the hysteresis correction quantity operation unit 107 constituting the hysteresis correction unit 105 includes an amplifier 118 for amplifying the output of the code discriminator 117. The output of the amplifier 118 is added together with the output of the subtractor 15 by the adder 119. The output of the adder 119 is supplied through the motor driving voltage conversion unit 108 having a saturation function to the DC motor 20.

Figure 11:
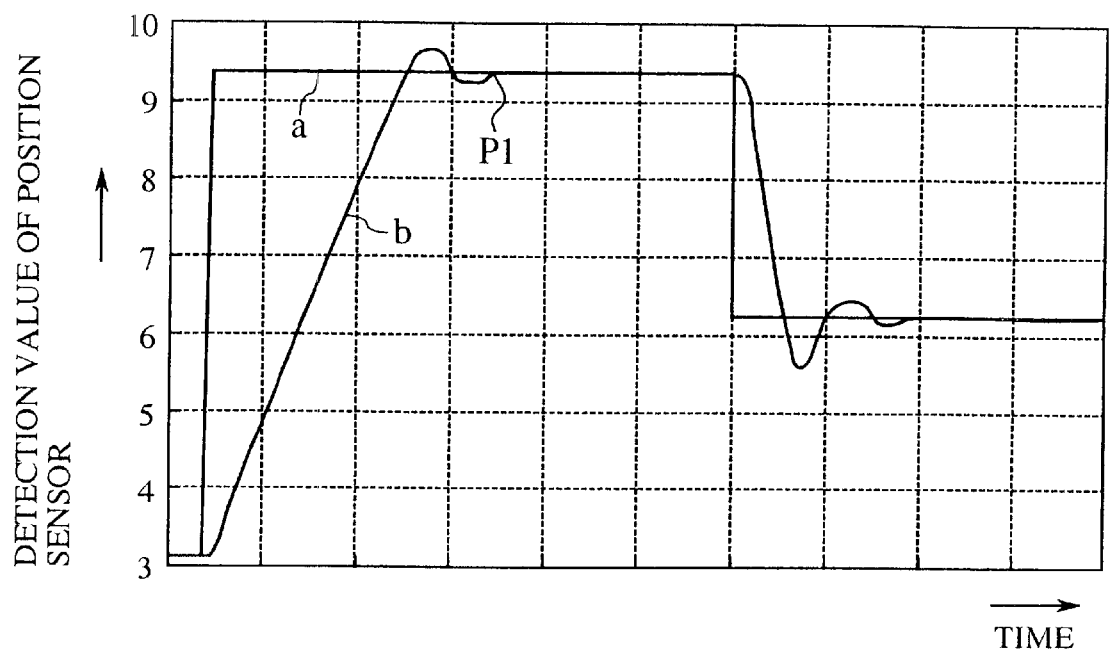
FIGS. 11(a) and 11(b) are graphs showing operation characteristics of the EGR valve of the first embodiment.
Figure 11:
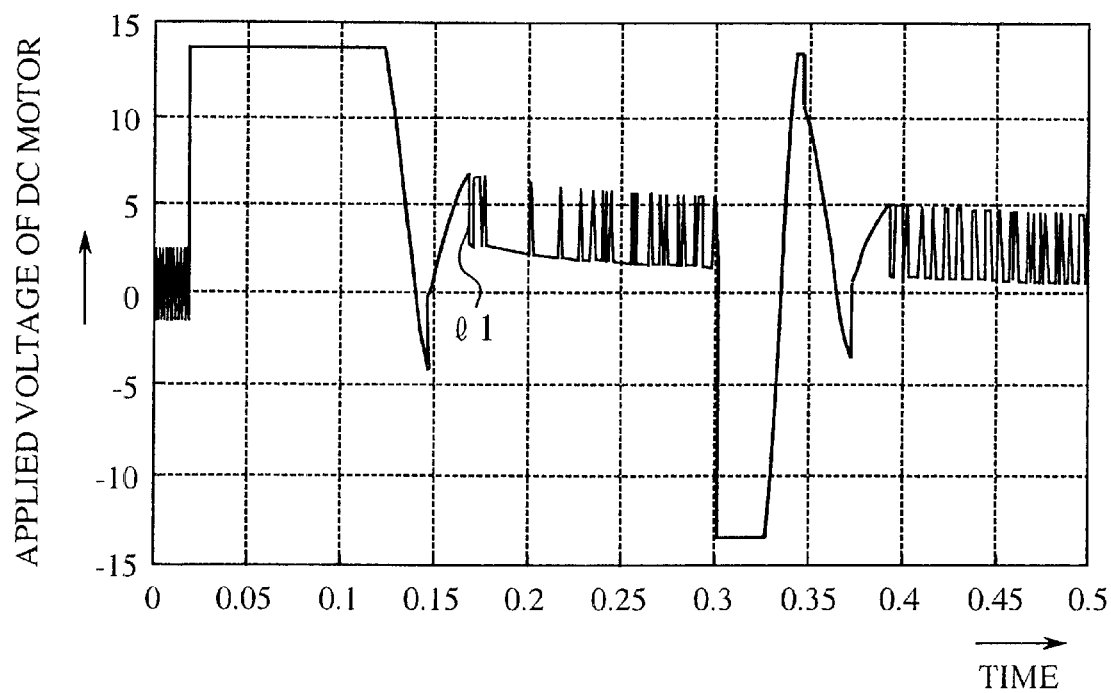

FIG. 11(a) is a graph showing the variation of the detection value (ordinate) of the position sensor 104 with respect to time (abscissa), in which a indicates an ideal characteristic, and b an actual operation characteristic. FIG. 11(b) is a graph showing the variation of the applied voltage of the DC motor with respect to time (abscissa).

Next, an operation will be described.

When the target value (2) is entered from an external unit, the current value (2) detected by the position sensor 104 and deviation obtained by subtraction at the adder/subtractor 111 are amplified by the amplifiers 112 and 113. The output of the amplifier 113 is integrated by the integrator 114, and then fed to the subtractor 115 together with the output of the amplifier 112 for subtraction.

Then, the output of the subtractor 115 is differentiated by the differentiator 116, and a determination is made by the code discriminator 117 as to whether the value of the integration is $\leq 0$ or $0 \geq$. The −1 output or the +1 output from the code discriminator 117 is amplified by the amplifier 108 to obtain a hysteresis correction quantity. In this case, by controlling the gain of the amplifier based on a start-up current at each start-up, it is always possible to obtain a proper hysteresis correction quantity.

Figure 15:
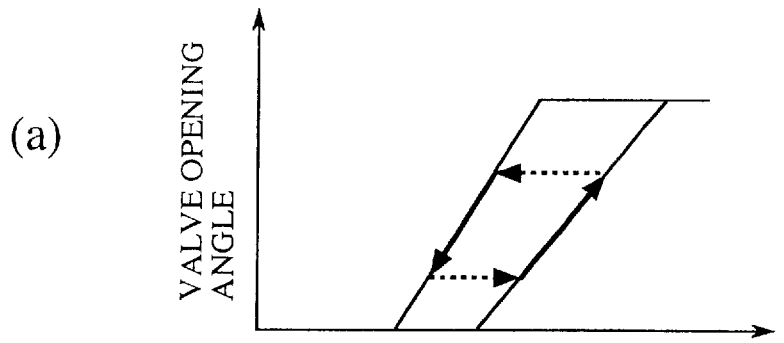
FIGS. 15(a) to 15(c) are graphs showing hysteresis cancellation.
Figure 15:
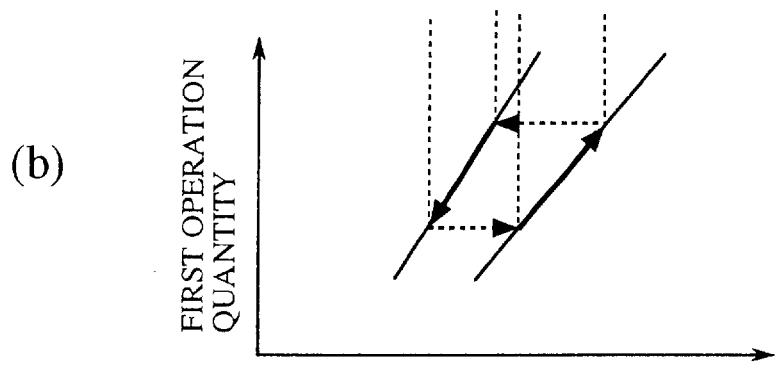
Figure 15:
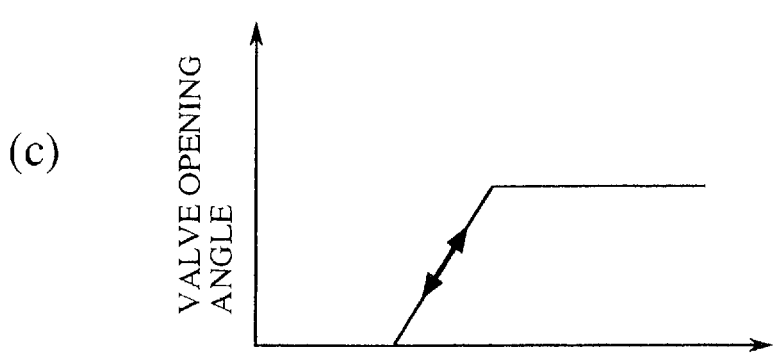

Then, the hysteresis correction quantity is added to the output of the subtractor 115 by the adder 119. Accordingly, as shown in FIG. 15(b), a characteristic of a first operation quantity (output quantity of the adder 119) with respect to a motor driving voltage value becomes identical to the hysterisis characteristic of a valve opening angle with respect to a motor driving voltage value shown in FIG. 15(a). Thus, the characteristic of the valve opening angle with respect to the first operation quantity resulting from a combination of both characteristics is as shown in FIG. 15(c), which reveals that hysteresis is eliminated.

Therefore, by driving the DC motor 20 based on the output of the motor driving voltage conversion unit 108 having received the output of the adder 119, the moment the output of the position sensor 104 coincides with the target value (1) (point P1 of FIG. 11(a)), the output of the adder 119 providing the motor voltage is suddenly changed as indicated by a straight line 11 in FIG. 11(b), making it possible to perform control without any hysteresis delay W.

As apparent from the foregoing, according to the first embodiment, by obtaining a hysteresis correction quantity from the output quantity of the PI controlled variable operation unit, and canceling the hysteresis of the EGR valve based on the hysteresis correction quantity, it is possible to control the control valve with high accuracy and responsiveness.

Second Embodiment

Figure 12:
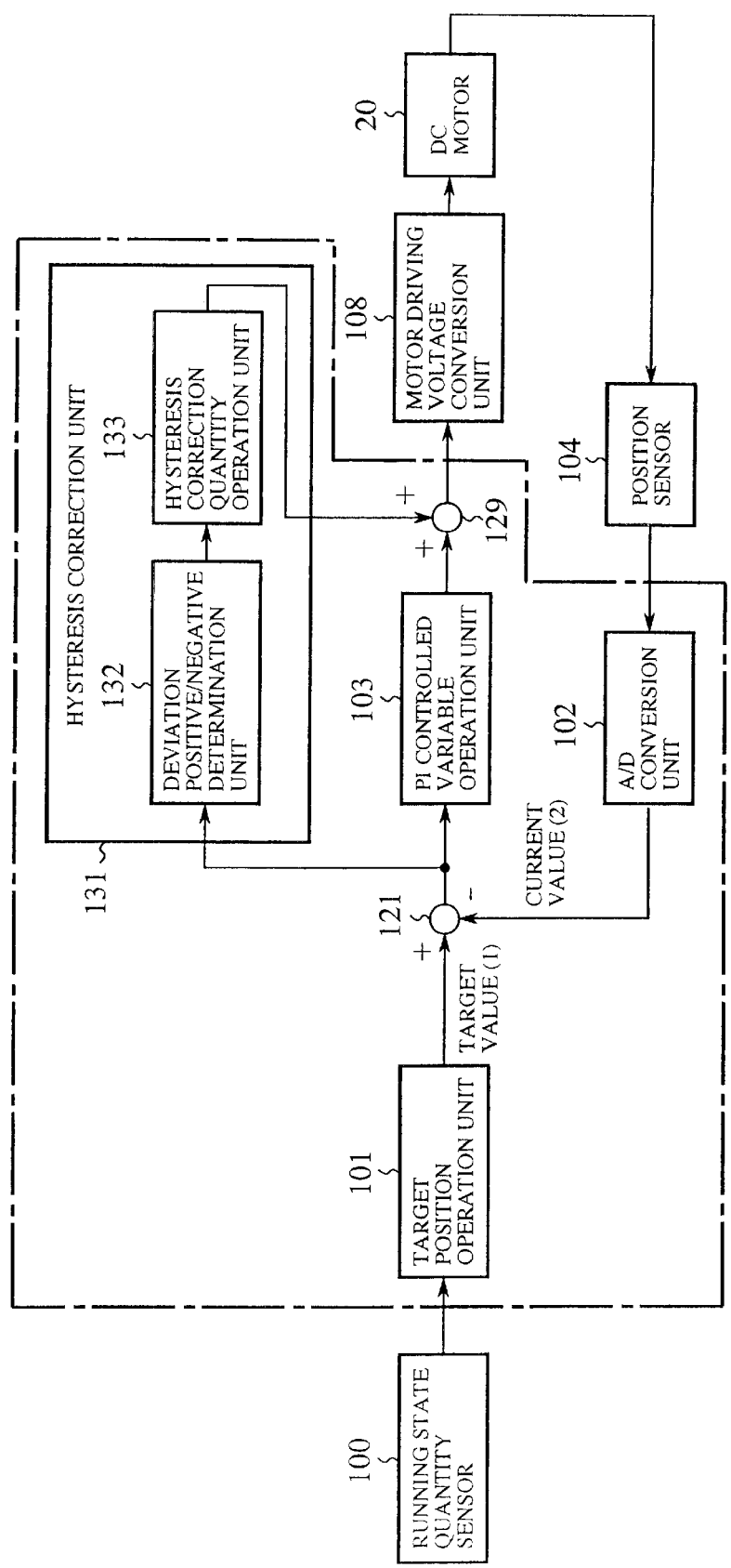
FIG. 12 is a constitutional view showing a control unit in an EGR valve controller according to a second embodiment of the invention.

FIG. 12 is a constitutional view showing a control unit in the controller of the control valve 11 according to the second embodiment of the invention. In FIG. 12, a reference numeral 131 denotes a hysteresis correction unit, which includes: a positive/negative deviation determination unit 132 for determining the direction in which the input of the PI controlled variable operation unit 103 varies; and a hysteresis correction quantity operation unit 133 provided in the output side of the deviation positive/negative determination unit 132. Since the other components are similar to those of the first embodiment, like elements are denoted by like reference numerals, and the description thereof will be omitted.

Figure 13:
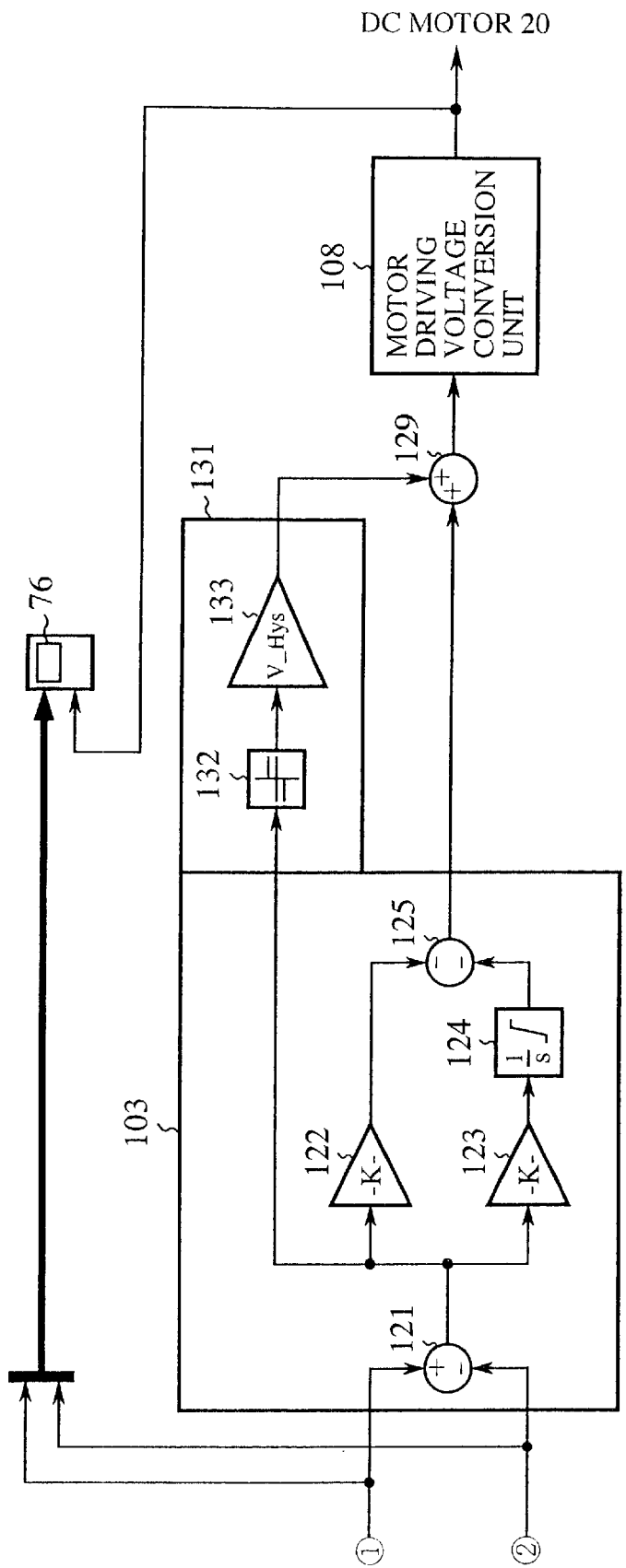
FIG. 13 is a circuit diagram of a PI controlled variable operation unit and a hysteresis correction unit in the control unit of FIG. 12.

FIG. 13 shows in detail the PI controlled variable operation unit 103, and the hysteresis correction unit 131. The PI controlled variable operation unit 103 includes: amplifiers 122 and 123 for amplifying the output of an adder/subtractor 121 for adding/subtracting target and current values (1) and (2); an integrator 124 for integrating the output of the amplifier 123; and a subtractor 125 for subtracting one from the other the outputs of the amplifier 122 and the integrator 124.

The hysteresis correction unit 131 includes: the positive/negative deviation determination unit 132 having a code discriminator for determining whether the deviation output of the adder/subtractor 121, i.e., the input quantity of the PI controlled variable operation unit 103, is $\geq 0$ or $\leq 0$, outputting +1 if $\geq 0$ and −1 if $\leq 0$; and the hysteresis correction quantity operation unit 133 having an amplifier provided in the output side of the deviation positive/negative determination unit 132. The output of the hysteresis correction quantity unit 133 is added together with the output of the subtractor 125 by the adder 129, and the output of the adder 129 is supplied through the motor driving voltage conversion unit 108 having a saturation function to the DC motor 20.

Figure 14:
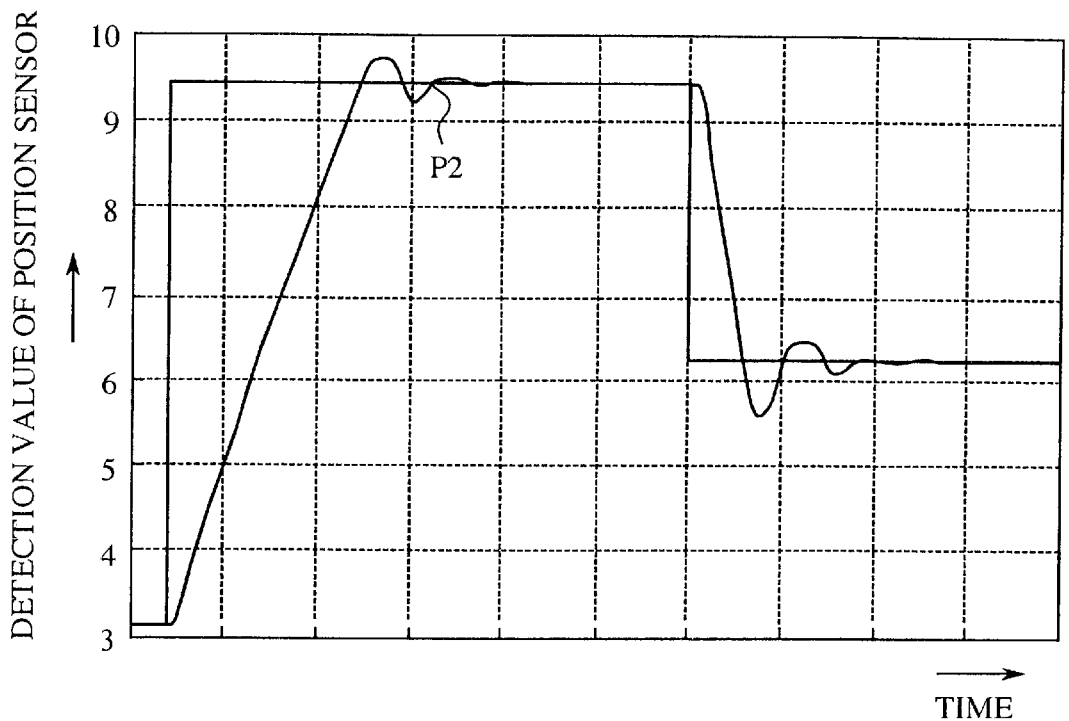
FIGS. 14(a) and 14(b) are graphs showing operation characteristics of the EGR valve of the second embodiment.
Figure 14:
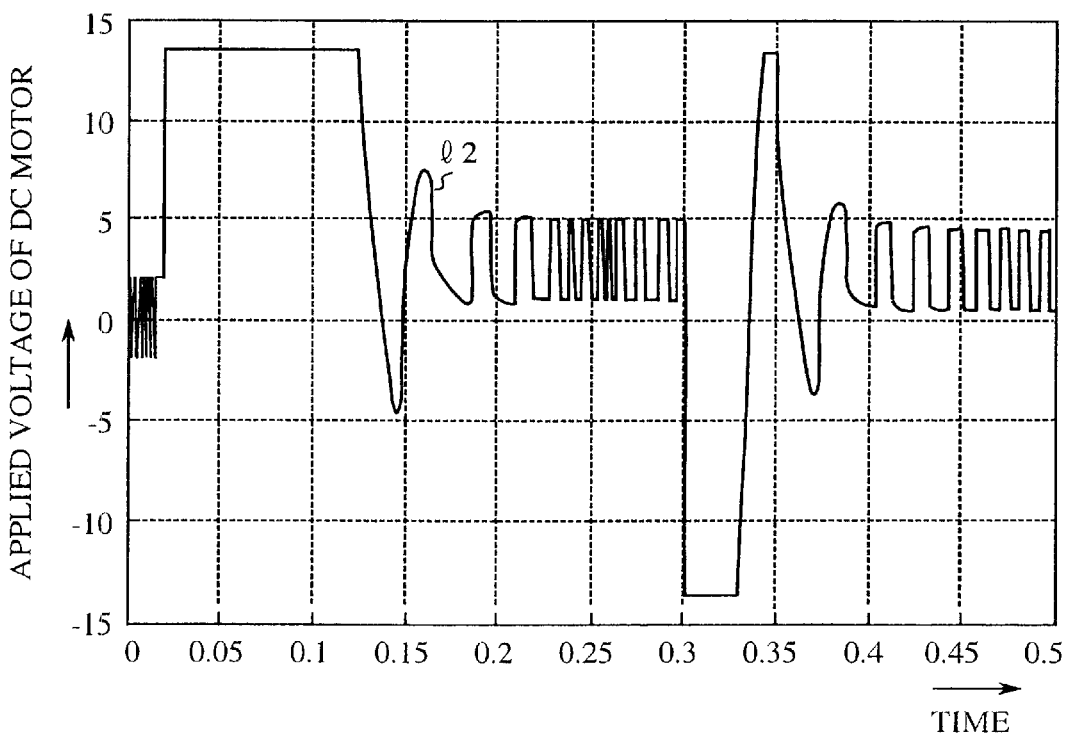

FIG. 14(a) is a graph showing the characteristic of the detection value (ordinate) of the position sensor 104 with respect to time (abscissa), in which a indicates an ideal characteristic, and L an actual operation characteristic. FIG.

14(b) is a graph showing a characteristic view of the applied voltage of the DC motor with respect to time (abscissa).

Next, an operation will be described.

When the target value (1) is entered from the external unit, the current value (2) detected by the position sensor 104, and a controlled variable obtained by addition/subtraction at the adder/subtractor 121 are amplified by the amplifiers 122 and 123. The output of the amplifier 123 is integrated by the integrator 124, and then subtracted from the output of the amplifier 122 by the subtractor 125.

Then, a determination is made by the deviation positive/negative determination unit 132 as to whether the output of the adder/subtractor 121, i.e., the input quantity of the PI controlled variable operation unit 103, is ≦0 or ≧0. The −1 output or the +1 output is amplified by the hysteresis correction quantity operation unit 133 to obtain a hysteresis correction quantity. In this case, by controlling the gain of the hysteresis correction quantity operation unit 133 based on a start-up current at each start-up, it is always possible to obtain a proper hysteresis correction quantity.

Then, the obtained hysteresis correction quantity is added to the output of the subtractor 125 by the adder 129, and the DC motor 20 is driven based on the output of the motor driving voltage unit 108, to which the output of the adder 129 has been entered. Accordingly, for a reason similar to that for the first embodiment, the moment the output of the position sensor 104 coincides with the target value (1) (point P2 in FIG. 14(a)), the applied voltage of the DC motor 20 is suddenly changed as indicated by a straight line 12 in FIG. 14(b), making it possible to perform control without any hysteresis delay.

As apparent from the foregoing, according to the second embodiment, by obtaining a hysteresis correction quantity of the EGR valve from the input quantity of the PI controlled variable operation unit 103, and canceling the hysteresis of the EGR valve based on the hysteresis correction quantity, it is possible to control the control valve with high accuracy and responsiveness.

INDUSTRIAL APPLICABILITY

As can be understood from the foregoing description, the exhaust gas recirculation valve controller of the present invention is suitably used to return a portion of exhaust gas in the exhaust passage a to the intake passage b in quick response to a change in the operation state of the engine.

What is claimed is:

1. A controller for an exhaust gas recirculation valve adapted to open/close on torque balance between a return torque applied by pressing means in one direction selected from opening and closing directions of a control valve, and a motor torque applied by a DC motor in the opening or closing direction of the control valve, comprising:

a PI controlled variable operation unit for receiving a deviation between input data indicative of a target opening/closing position of the control valve, and detection data indicative of a current opening/closing position of the control valve;

a hysteresis correction unit for obtaining, a hysteresis correction quantity from an output quantity of the PI controlled variable operation unit; and a motor driving voltage conversion unit for receiving a sum of the output quantity of the PI controlled variable operation unit and the hysteresis correction quantity, and converting the result into a voltage to be supplied to the DC motor.

2. The controller for an exhaust gas recirculation valve according to claim 1, wherein the hysteresis is correction unit includes: a changing direction determination unit composed of a differentiator for differentiating the output quantity of the PI controlled variable operation unit, and a code discriminator for determining whether an output of the differentiator is equal to 0 or lower; and a hysteresis correction quantity operation unit composed of an amplifier for amplifying an output of the code discriminator.

3. A controller for an exhaust gas recirculation valve adapted to open/close on torque balance between a return torque applied by pressing means in one direction selected from opening and closing directions of a control valve, and a motor torque applied by a DC motor in the opening or closing direction of the control valve, comprising:

a PI controlled variable operation unit for receiving a deviation between input data indicative of a target opening/closing position of the control valve, and detection data, indicative of a current opening/closing position of the control valve;

a hysteresis correction unit for obtaining a hysteresis correction quantity from an input quantity of the PI controlled variable operation unit; and a motor driving voltage conversion unit for receiving a sum an output quantity of the PI controlled variable operation unit and the hysteresis correction quantity, and converting the result into a voltage to be supplied to the DC motor.

4. The controller for an exhaust gas recirculation valve according to claim 3, wherein the hysteresis correction unit includes: a positive/negative deviation determination unit for determining whether the input quantity of the PI controlled variable operation unit indicating a deviation between target and current values is equal to 0 or lower; and an amplifier for amplifying an output of the deviation positive/negative determination unit.

* * * * *